Sept. 15, 1925.

A. C. LOYOLA

AUTOMOBILE SIGNALING DEVICE

Filed July 19, 1923

1,553,545

5 Sheets-Sheet 1

Inventor
A. C. Loyola
By Jacobi & Jacobi
Attorneys

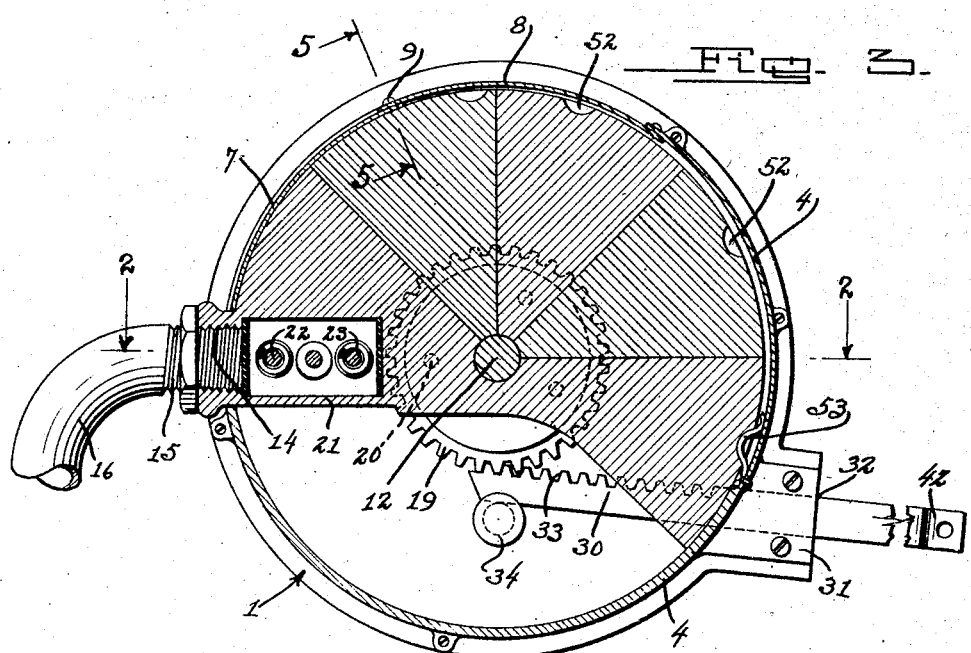

Sept. 15, 1925.
A. C. LOYOLA
1,553,545
AUTOMOBILE SIGNALING DEVICE
Filed July 19, 1923     5 Sheets-Sheet 3
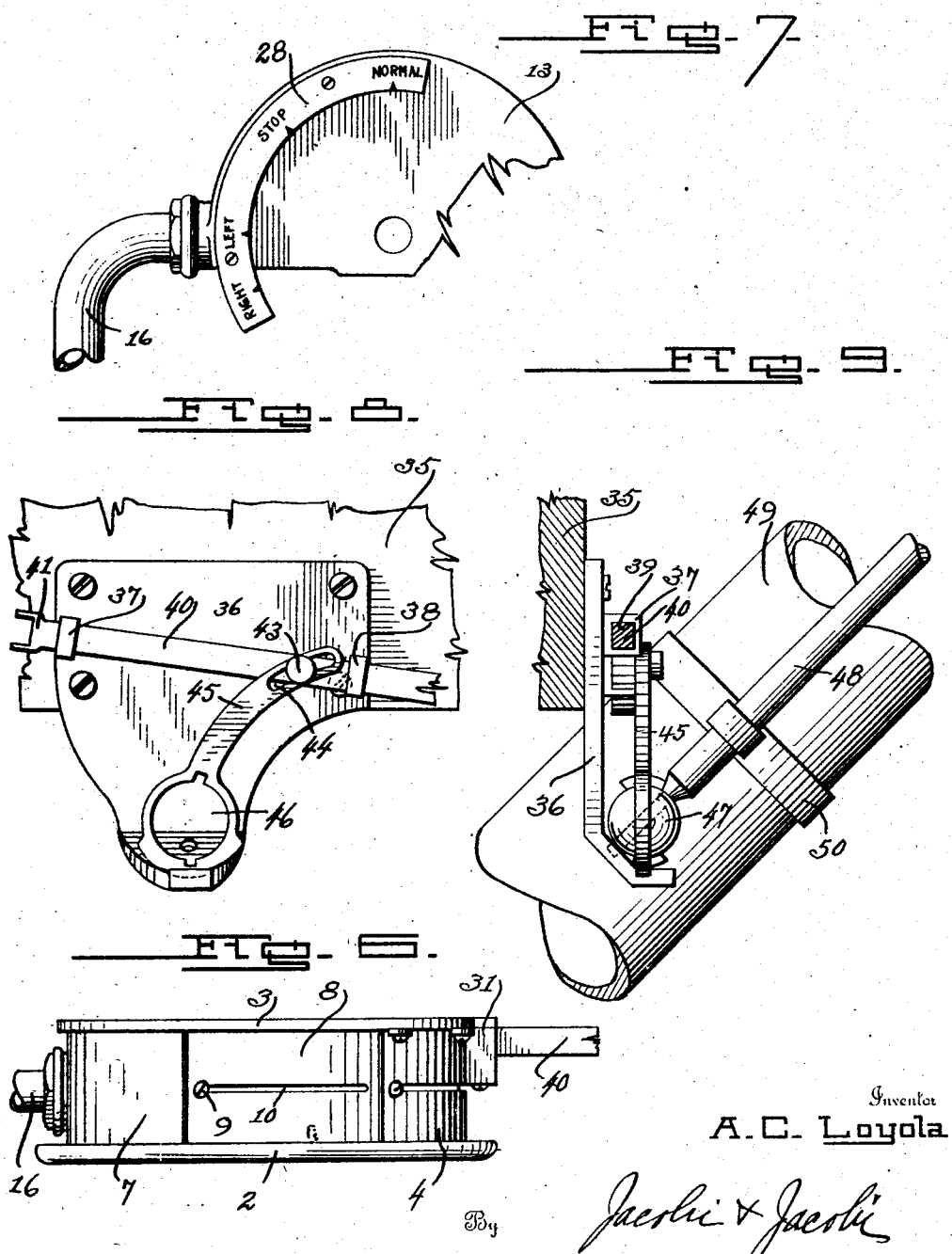
Inventor
A.C. Loyola
By Jacobi & Jacobi
Attorneys Sept. 15, 1925.

A. C. LOYOLA 1,553,545

AUTOMOBILE SIGNALING DEVICE

Filed July 19, 1923

5 Sheets-Sheet 4

Inventor

A. C. Loyola

By Jacobi & Jacobi

Attorneys

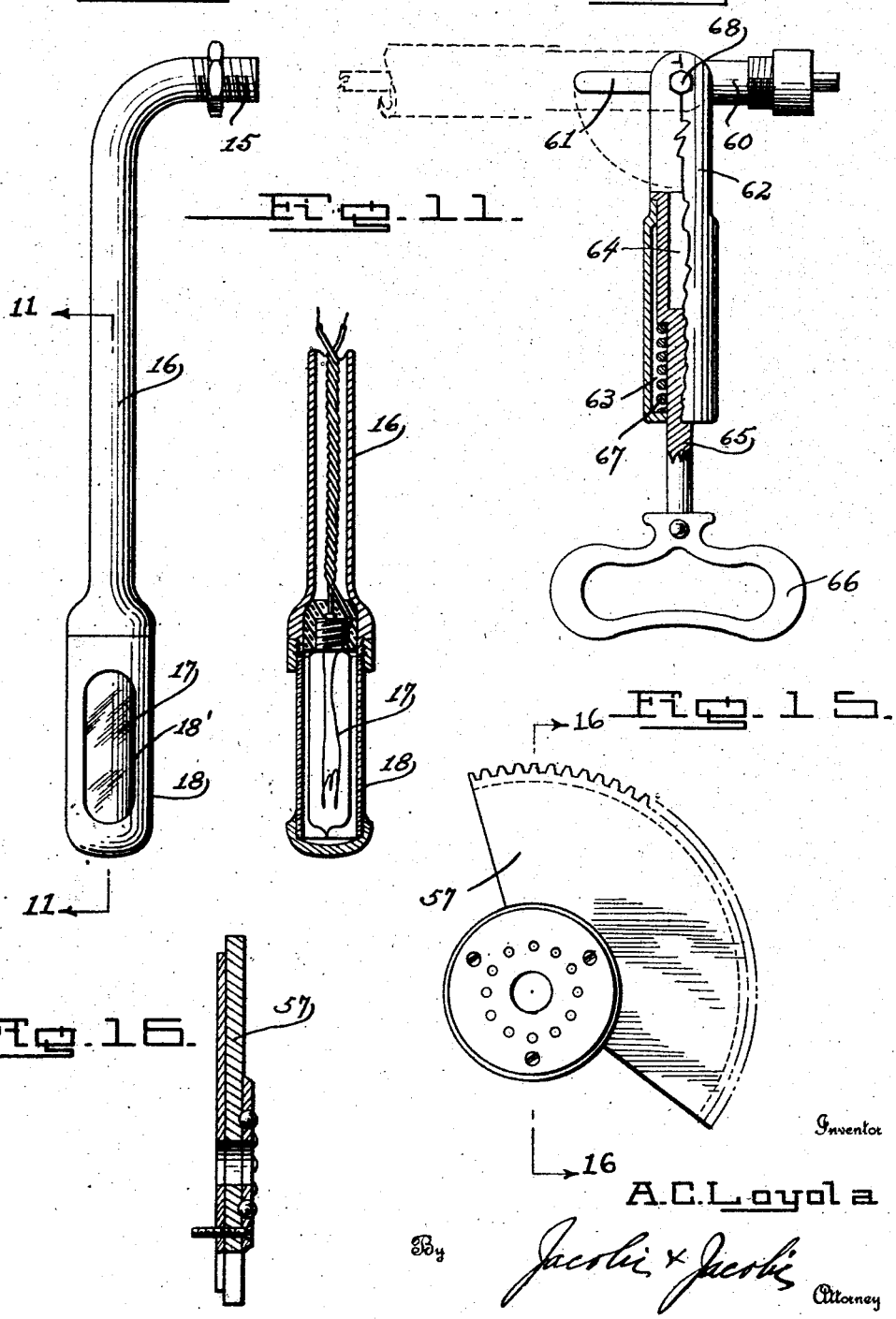

Patented Sept. 15, 1925.

1,553,545

UNITED STATES PATENT OFFICE.

ADOLPH C. LOYOLA, OF SACRAMENTO, CALIFORNIA.

AUTOMOBILE SIGNALING DEVICE.

Application filed July 19, 1923. Serial No. 652,573.

*To all whom it may concern:*

Be it known that ADOLPH C. LOYOLA, a citizen of the Republic of Peru, residing at Sacramento, in the county of Sacramento and State of California, has invented certain new and useful Improvements in Automobile Signaling Devices, of which the following is a specification.

This invention relates to new and useful improvements in automobile signaling devices and has for its principal object to provide a simple and efficient device for use upon automobile to indicate the direction in which the automobile is about to turn, or stop, the device being visible at night as well as in the day time.

Another important object of the invention is to provide an automobile signaling device of the above mentioned character which is of such a construction as to enable the same to be mounted upon a vehicle and actuated by the driver thereof without the necessity of having to move his hand from the steering wheel in order to give the proper signal so as to enable the vehicle in the rear to determine whether the automobile is about to turn either to the left or to the right, or stop.

An equally important object of the invention is to provide an automobile signaling device of the above mentioned character which is of such a construction as to be operated by the person driving the vehicle in a simple and efficient manner wherein the proper signal is actuated and furthermore is provided with a means to indicate to the driver of the vehicle the position of the signal.

A still further object of the invention is to provide a signaling device of the above mentioned character which will be operable in various positions to indicate the direction in which the vehicle is travelling and this signal being actuated by a member conveniently located in close proximity and to the ready access of the operator of the vehicle.

A further object of the invention is to provide an automobile signaling device of the above mentioned character which is simple in construction, inexpensive, strong and durable and well adapted for the purposes for which it is designated.

Other objects and advantages of this invention will become apparent during the course of the following description.

Figure 1:
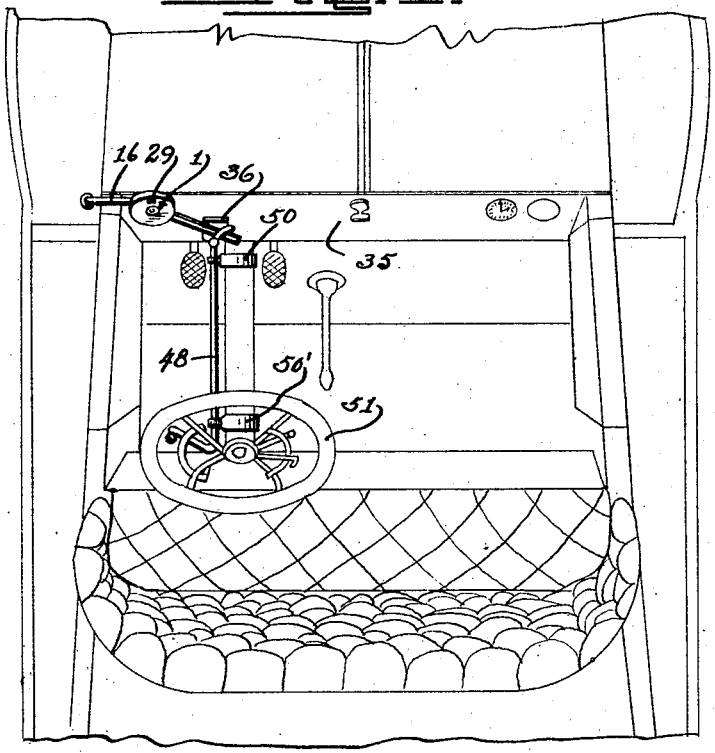

In the accompanying drawings forming a part of this specification and in which like numerals designate like parts throughout the same, Figure 1 is a plan view of the signaling device showing the same mounted in an operative position upon the instrument board of a vehicle.

Figure 2:
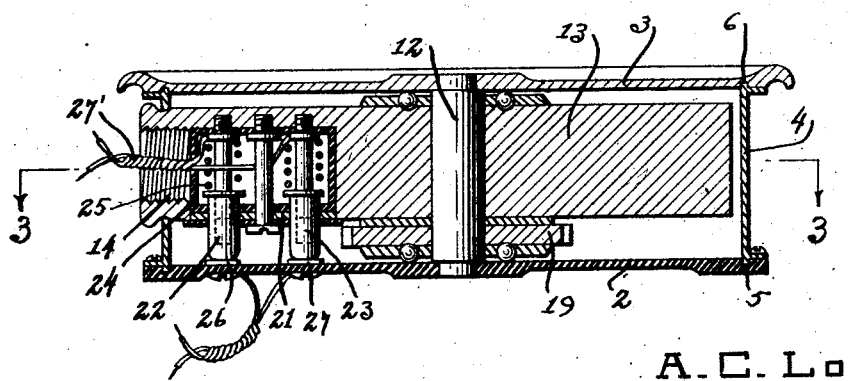
Figure 12:
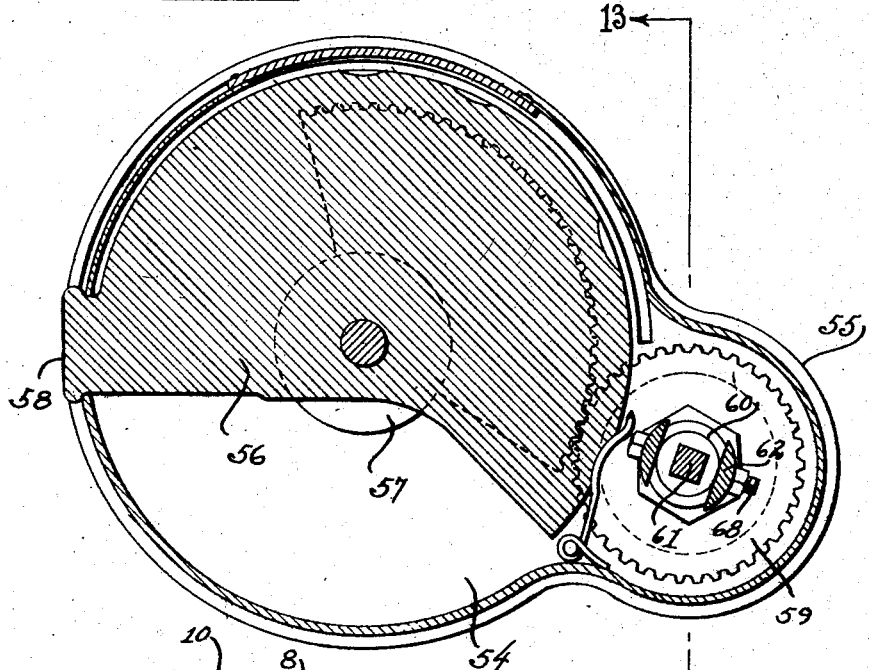
Figure 13:
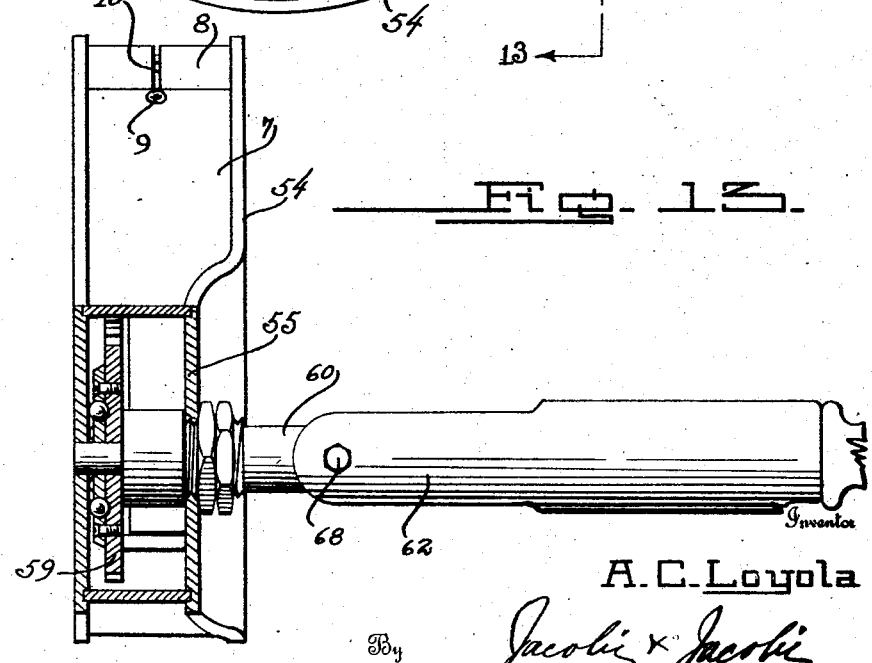

Figure 2 is a sectional view taken on the line 2—2 of Fig. 3,

Figure 3 is a horizontal section taken on line 3—3 of Fig. 2 and looking in the direction of the arrows, Figure 4 is a detail view showing the inner side of the bracket plate or casing, Figure 5 is a fragmentary sectional view showing the fenders in overlapping relation, Figure 6 is a plan view of the fender construction as shown in Fig. 5, Figure 7 is a fragmentary detail of the movable member showing the indicia on the front face thereof, Figure 8 is a front elevation of a support for the actuating means for said movable member, showing the same mounted upon the instrument board, Figure 9 is a fragmentary side elevation of the same showing the parts in section, Figure 10 is a side elevation of a signal indicating arm, Figure 11 is a sectional view taken on line 11—11 of Fig. 10, Figure 12 is a sectional view of a modification of the signaling arm operating device, Figure 13 is a sectional view taken on line 13—13 of Fig. 12, Figure 14 is a front elevation, partly in section of the operating lever used in conjunction with the modification, Figure 15 is a side elevation of the segmental gear in the modification, and Figure 16 is a section taken on line 16—16 of Fig. 15.

In the drawings wherein for the purpose of illustration is shown the preferred embodiment of my invention, the numeral 1 designates generally the circular casing and comprises the spaced front and rear faces 2 and 3 respectively. These faces are held in spaced relation by means of a ring 4 which is secured to the inner sides of the front faces adjacent the edges thereof and extends for the greater circumference of said faces for the purpose hereinafter to be more fully described, The front and rear faces 2 and 3 of the casing 1 are furthermore provided with registering grooves 5 and 6 on the inner sides thereof, and these grooves 5 and 6 are arranged adjacent the under side of the split ring 4. Adapted to be supported between the front and rear faces 2 and 3 of the casing 1 and within the grooves 5 and 6 formed therein, are the fenders 7 and 8 respectively. These fenders 7 and 8 are adapted to cover over the openings formed between the front and rear faces and between the free ends of the split ring 4. The fender 7 is provided with an upstanding lug 9 and this lug 9 is adapted to be slidably mounted in a longitudinal slot 10 provided in the fender 8. The purpose of such a construction is to enable the fender 7 to move with the movable member hereinafter to be more fully described, and upon movement of the latter, the fender 7 will cause the upstanding lug 9 carried thereby to operate in the slot 10 provided in the fender 8 and when the lug has reached the extremity of the slot 10 it will cause the fender 8 to move together with the movable member, and the fender 7 and thereby enable the proper rotation of the movable member for the operation of the signaling member. It being further understood that the fender 8 is slidably associated with the under side of the split ring 4.

Rotatably mounted upon the pin 12 in the casing 1 is the rotary member 13. The rotary member 13 comprises an arcuate shaped member which has portions thereof hollowed out to provide suitable receptacles for receiving weights or the like. The rotary member 13 is furthermore provided with an internally threaded neck portion 14 which extends between the front and rear faces of the casing 1 and outwardly of said split ring 4. The internally threaded sleeve or neck portion 14 is furthermore adapted to receive the threaded end 15 of a tubular rod 16, the latter carrying at its outer end the incandescent electric lamp bulb 17 and a suitable casing 18 is provided therefor. This casing 18 has its side portions cut out as shown at 18' in the drawings to permit the proper functioning of the electric light bulb 17 whereby the same may be readily visible. The purpose of the tubular construction as shown at 16 is to permit the wiring to the electric light bulb to be carried therein so as to form a signal indicating arm. The rotary member 13 is provided at its front face with the gear 19. This gear 19 is secured to the front face of the rotary member 13 by any suitable fastening means such as shown at 20 in the drawings. The rotary member 13 is furthermore provided with a cavity 21 and this cavity is arranged in registry with the threaded neck 14 for the purpose of receiving a housing, the contacts 22 and 23 which are mounted in a suitable insulated casing 24. The contacts 22 and 23 are normally urged by the spring 25 through the front face of the casing 24 and are adapted to engage the spaced contact plates 26 and 27 which are carried by the inner side of the front face 2 as more clearly shown in Fig. 2 of the drawings. It is to be further understood that the wiring 27 is wired up to the contacts 22 and 23 and to the battery of the automobile in the well known manner and for the purpose of providing a suitable contact making device whereby the electric light bulb 17 may be illuminated for the purposes well known in the art.

In the opposite face of the rotary member 13 is carried a strip 28 on which is printed the necessary indicia as more clearly shown in Figs. 5 and 7 of the drawing and this strip is arranged on the rotary member in close proximity to the connection with a signal indicating arm 16 and co-operating with the indicia carrying strip 28 is the slot or cut out portion 29 provided in the corresponding adjacent face of the casing 1 whereby the position of the signal arm 16 may be readily ascertained by the operator of the automobile without the necessity of having to glance out of the car in order to determine the exact position of the signal indicating arm. The casing 1 is mounted upon the instrument board of the automobile as clearly shown in Fig. 1 of the drawings, and the signal indicating arm 16 is adapted to extend through a suitable opening provided in the body of the automobile adjacent the instrument board for the purpose of permitting the signal indicating arm to properly function.

For the purpose of operating the signal indicating arm to various positions in order to give the proper signals, I provide the sliding bar 30 which is provided with ratchet teeth 33 in its upper face for engagement with the gear 19 carried by the rotary member 13, and this sliding bar 30 is adapted to pass through a suitable opening provided in the extension 4 and through a suitable guide 31 provided in the extension 32 which forms a bracket for supporting the casing upon the instrument board. To further assure the ratchet teeth 33 on the upper face of the sliding bar 30 to mesh with the gear 19, I provide the guide roller 34 within the casing and in close proximity to the gear 19 in the manner as more clearly shown in Fig. 3 of the drawings whereby the free end of the sliding bar 30 may properly operate.

Mounted upon the instrument board 35 is the bracket 36 and this bracket is provided with upstanding ears 37 and 38 respectively, these ears being furthermore provided with openings 39 for the purpose of receiving the rod 40. One end of the rod 40 is provided with a yoke 41 and this yoke is adapted to co-operate with the yoke 42 formed upon the sliding bar 30 whereby a universal joint connection is provided within the sliding bar 30 and the rod 40 for the purposes to be hereinafter more fully described.

A suitable pin 43 is carried by the rod 40 and is adapted to be received in the slot 44 provided in the outer end of the arm 45. The opposite end of the arm 45 is enlarged and is provided with an enlarged aperture 46 for the purpose of receiving the spherical head 47 of the actuating member 48. This actuating member 48 extends longitudinally on the steering column 49 and is guided through a suitable apertured sleeve 50 which is passed around the steering column and secured at its respective ends for the purposes of providing a guide for the actuating member 48. The upper end of the member 48 extends through a similar guide as shown at 50ᵃ and mounted adjacent the steering wheel 51 and is bent at an angle to provide a quadrant which is in close proximity to the steering wheel whereby the actuating member 48 may be turned to move the arm 45 towards the left so as to move the pin 43 and which results in the inward movement of the rod 44 so as to cause the sliding bar 30 to move inwardly within the casing 1 and impart rotary movement through the gear 19 through the rotary member 13.

Normally the signal indicating arm 16 is disposed downwardly and when the operator of the vehicle desires to turn either to the left or right, the actuating member 48 is operated so as to impart rotary movement to the rotary member 48 in the manner heretofore described, and when this rotary member 13 rotates about the pin 12, the signal indicating arm 16 will be caused to move with the same and thereby cause the arm to move in a horizontal position. The position that the arm takes can be readily seen by glancing to the aperture 29 provided in the casing 1 and the indicia carried by the strip 28 which is mounted on one face of the rotary member 13 and will at once indicate to the operator of the vehicle the exact position in which the arm is set. If the indicating means shows that the signal is extended to indicate that the vehicle is about to turn to the left, the operator can cause the signal indicating arm to give the signal when he desires to turn to the right by merely operating the actuating member 48 until the desired position has been obtained.

To further hold the signal indicating arm 16 in proper position, the peripheral face of the rotary member 13 is provided with spaced depressions 52 and suitable flat springs 53 are carried by the inner side of the split ring 4 to fit in each or any of the depressions 52 upon the movement of the rotary member 13 so as to cause the depressions 52 to come in contact with the flat spring 53. In this manner the rotary member 13 and the signal indicating arm 16 are held in proper position, thereby preventing the accidental movement of the signal indicating arm and furthermore causing confusion as to the intention of the driver of the vehicle to the people in the vehicle in the rear. In the night it will be further understood that the contact on the rotary members and in the casing when the proper switch is turned on will light the electric light bulb 17 in the outer end of the signal indicating arm to make the signal clearly visible.

In Figs. 12, 13, 14, 15 and 16 of the drawing a modification of the signal operating mechanism is shown wherein the numeral 54 designates a casing provided with a reduced portion 55. A rotary member 56 is mounted in the casing 54 and carried on one face thereof a segmental gear 57. It being further understood that the rotary member 26 is provided with an internally threaded neck 58 similar to the threaded neck 14 for the purpose of receiving a signal indicating arm as shown in Figs. 10 and 11 of the drawing.

Rotatably mounted in the reduced portion 55 of the casing 54 is the gear wheel 59 and this gear wheel 59 is adapted to mesh with the segmental gear 57 which is carried by the rotary member 56 in any suitable manner such as is shown in Fig. 16 of the drawing. The gear wheel 59 is furthermore provided with a sleeve 60 which extends in the casing and terminates in a shank 61 the latter being square in cross section. Pivotally carried by the sleeve 60 is the yoke 62 and this yoke is provided with a cylindrical socket 63 at its lower end. Slidably mounted in the socket 63 of the yoke 62 is the member 64 which is provided with an elongated extension 65 terminating in a suitable handle 66 whereby the same may be operated. The shank engaging member 64 is in the form of a socket, and a suitable coil spring 67 is disposed within the cylindrical socket 63 around the elongated rod 65 and between the lower end of the shank engaging member 64 and the bottom of the socket 63.

Normally the yoke 62 is disposed on the pivotal pin 68 which is carried by the sleeve 60 in a downward position and when it is desired to rotate the segmental gear 57 whereby the rotary member 56 is caused to rotate in the casing 54 for the purpose of properly operating the signal arm, the handle 66 is pulled downwardly against the tension of the spring 67 and the yoke 62 will then swing into a horizontal position until the shank engaging member 64 is in registry with the shank 61 and by releasing the handle 66 the spring 67 will force the shank engaging member 64 into engagement with the shank 61 thereby holding the yoke 62 in horizontal alignment with the sleeve 60 and in this manner the gear wheel 59 may be rotated for the purpose of imparting rotary movement to the segmental gear 57 and to the rotary member 56.

With the construction of the above mentioned character, a signal indicating arm may be mounted on the side of the car adjacent the seat of the operator thereof and in close proximity to the driver whereby the handle 66 may be readily grasped to cause the rotary movement of the member 56 whereby the signal indicating arm is caused to be thrown into the desired position to indicate the movement of the vehicle.

It will thus be seen from the foregoing description that an automobile signaling device has been provided wherein a proper signal will be given from the operator of the car to the vehicles in the rear thereof to indicate the position of the direction the vehicle is about to take and will thereby prevent a number of accidents and collisions and furthermore relieve the possibility of congestion. Furthermore the signal arm is of such a construction as to enable the same to be readily visible both in the day time and in the night time.

The simplicity of the arrangement of my signaling mechanism will be very efficient and essential to every automobile and can be placed thereon without interfering with the operation of the vehicle in any manner and also at a minimum cost.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to without departing from the spirit or sacrificing any of the principles of the invention.

I claim—

1. An automobile signaling device of the class described comprising a casing, a rotary member mounted therein, a signal indicating member detachably carried thereby and extending radially outwardly of said casing, means in said casing for operating said rotary member, said rotary member provided with spaced depressions in the periphery thereof, and spring means carried by said casing and adapted to fit in one of said depressions to hold the said signal indicating arm in an adjusted position.

2. An automobile signaling device of the class described comprising a casing having a peripheral arcuate opening, a rotary member mounted therein, a signal indicating arm detachably carried thereby and extending radially outwardly of said casing, means in said casing for operating said rotary member, said rotary member provided with spaced depressions in the periphery thereof, a spring carried by said casing and adapted to fit in one of said depressions to hold said signal indicating arm in an adjusted position, said rotary member having indicia carried on one face thereof and adapted to register with an opening provided in said casing to indicate the position of said indicating arm.

3. An automobile signaling device of the class described comprising a circular casing including spaced front and rear faces, a flanged split ring between the peripheral edges thereof and extending for the greater circumference of said faces, a rotary member mounted in said casing, a signal indicating arm carried by said movable member and extending radially outwardly of said ring, means in said casing for operating said movable member, said arm movable between the ends of said split ring, and means for holding said movable member in a predetermined position.

4. An automobile signaling device of the class described comprising a circular casing including spaced front and rear faces, a flanged split ring therebetween adjacent the peripheral edges thereof and extending for the greater circumference of said faces, a movable member mounted in said casing, a signal indicating arm carried by said movable member and extending radially outwardly of said ring, means in said casing for operating said movable member, said movable member being movable between the ends of said split ring, and means for actuating said last mentioned means.

5. An automobile signaling device of the class described comprising a circular casing including spaced front and rear faces, a flanged split ring therebetween adjacent the peripheral edges thereof and extending for the greater circumference of the faces, a movable member mounted in said casing, fenders slidably mounted between said front and rear faces and extending between the ends of said split ring, said fenders adapted to be actuated by said movable member, a signal indicating arm carried by said movable member and extending radially outwardly of said ring, means in said casing for operating said movable member, said indicating arm being movable between the ends of said ring, and means for holding said movable member in a predetermined position.

In testimony whereof I affix my signature.

ADOLPH C. LOYOLA.